United States Patent [19]
Yaroch

[11] Patent Number: 5,790,065
[45] Date of Patent: Aug. 4, 1998

[54] REMOTE CONTROL FOR VEHICULAR AUDIO SYSTEMS

[75] Inventor: James John Yaroch, Livonia, Mich.

[73] Assignee: Ford Motor Company, Dearborn, Mich.

[21] Appl. No.: 808,207

[22] Filed: Feb. 28, 1997

[51] Int. Cl.$^6$ .................................................. H04B 1/00
[52] U.S. Cl. ........................... 341/173; 341/176; 381/86; 340/825.09; 340/825.31; 340/438
[58] Field of Search ........................ 341/173, 174, 341/176; 340/438, 825.25, 825.69, 822.72, 825.31, 425.5, 426; 381/96

[56] References Cited

U.S. PATENT DOCUMENTS

| | | | |
|---|---|---|---|
| 4,940,964 | 7/1990 | Dao | 340/438 |
| 5,086,385 | 2/1992 | Launey | 364/188 |
| 5,339,362 | 8/1994 | Harris | 381/86 |
| 5,355,525 | 10/1994 | Lindmayer | 455/99 |
| 5,463,374 | 10/1995 | Mendez et al. | 340/442 |
| 5,525,977 | 6/1996 | Suman | 340/825.25 |
| 5,534,845 | 7/1996 | Issa et al. | 340/425.5 |
| 5,543,776 | 8/1996 | L'Esperance et al. | 340/426 |
| 5,546,273 | 8/1996 | Harris | 361/697 |
| 5,650,774 | 7/1997 | Drori | 340/825.32 |

*Primary Examiner*—Michael Horabik
*Assistant Examiner*—Albert K. Wong
*Attorney, Agent, or Firm*—Mark Mollon

[57] ABSTRACT

The remote entry system of an automotive vehicle is used to transfer remote control messages to an audio system thereby providing a low cost remote control feature for the audio system. In response to reception of uniquely coded RF control signals, the remote entry receiver communicates via a hard-wired communication link to the audio system causing the audio system to modify controlled audio system parameters in response to which pushbutton is activated on the remote transmitter. The remote entry system may interpret remote control signals differently depending upon the state of the ignition switch of the vehicle.

16 Claims, 3 Drawing Sheets

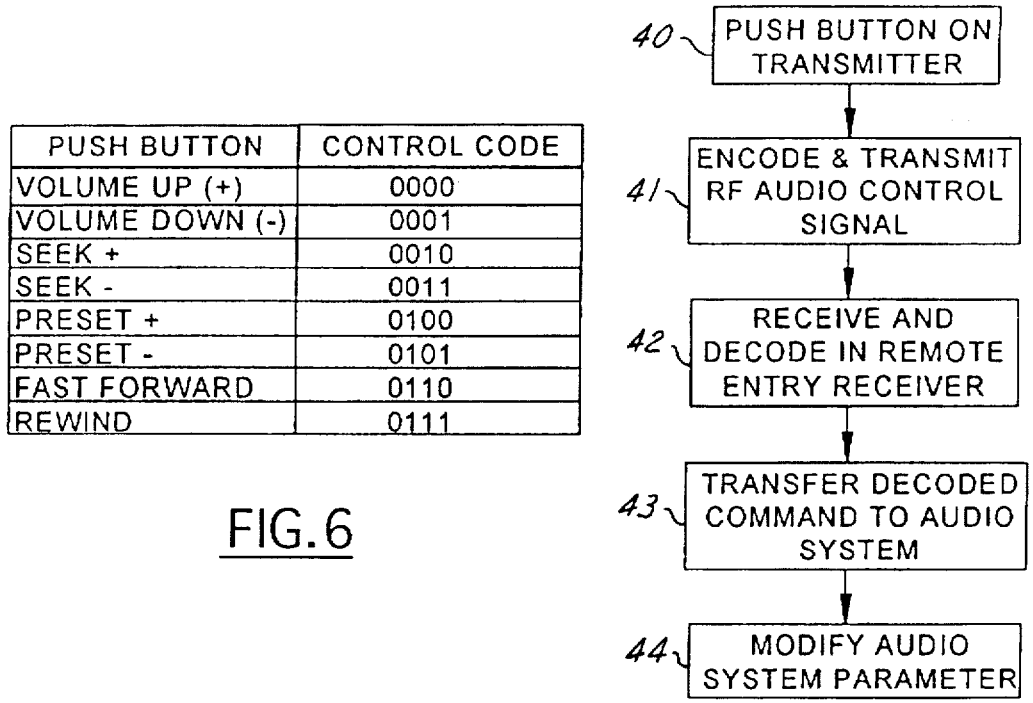
FIG. 6
FIG. 3
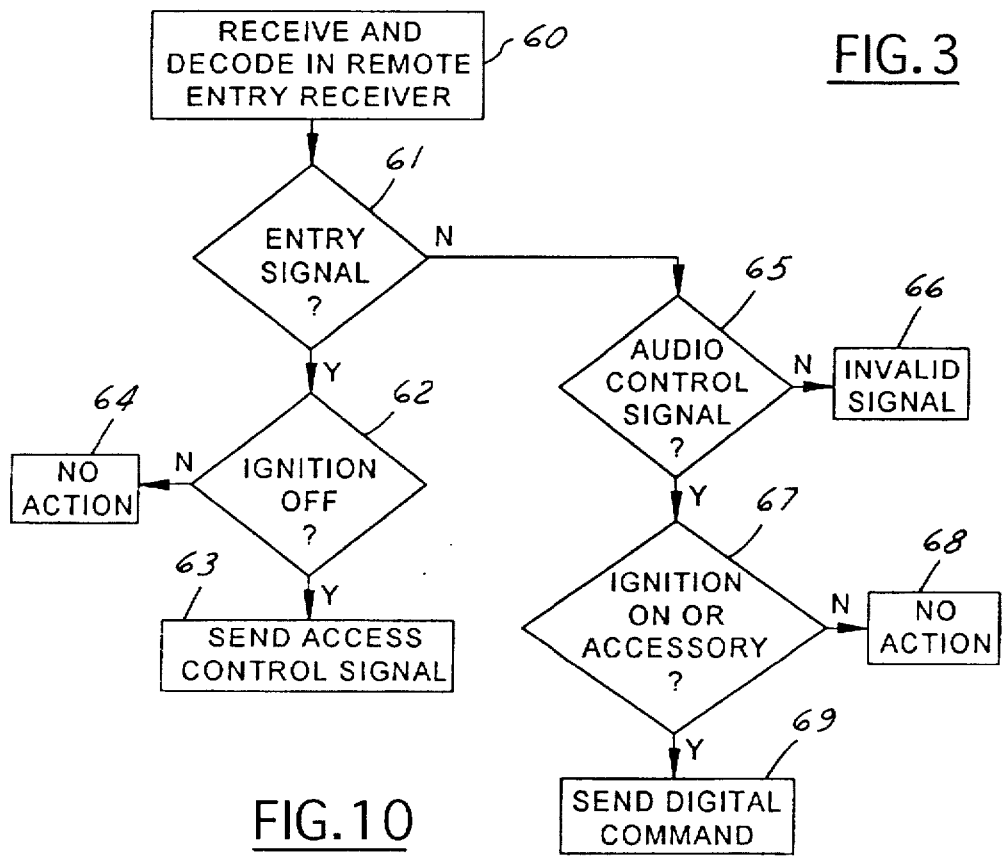
FIG. 10

REMOTE CONTROL FOR VEHICULAR AUDIO SYSTEMS

BACKGROUND OF THE INVENTION

The present invention relates in general to an in-car entertainment system having a remote control, and more specifically, to integrated remote control functions for an audio entertainment system and a remote entry security system.

Remote control of various electronic devices is known in the art, including the remote control of audio in-car entertainment systems in motor vehicles. The use of remote controls for vehicular audio systems is becoming popular by virtue of the added convenience that results from making controls more accessible to users in any position in the vehicle or even standing nearby the vehicle when it is parked.

Typical remote controls communicate with the audio system via a direct hard-wired connection or an infrared (IR) or radio-frequency (RF) link. Hard-wired remotes have the disadvantages that the cable attached to the remote may be a nuisance and movement of the remote is limited.

Infrared and radio-frequency systems suffer other disadvantages. In addition to the need for a special remote transmitter, a relatively more expensive receiver is required (which may be a very costly item even if integrated into the audio system). In addition, infrared remote controls, which are the most popular type of remote control currently used in vehicular audio systems, require an unobstructed beam path between the remote and the audio system in order to function.

SUMMARY OF THE INVENTION

The present invention has the advantages that a wireless remote control can be used in essentially any position in or near the vehicle to control the audio system, while the number of additional components to implement the remote control system are minimized thereby reducing the cost of providing the remote control feature.

Specifically, the present invention is an apparatus for an automotive vehicle providing a remote-controlled entry system and a remote-controlled audio system. The audio system reproduces audio signals having operator controlled audio system parameters. The audio system is responsive to digital commands for modifying the controlled audio system parameters. A first pushbutton RF transmitter has a plurality of pushbuttons each corresponding to a respective one of the digital commands. The first pushbutton RF transmitter transmits a uniquely coded RF audio-control signal in response to activation of a respective pushbutton. A remote entry receiver is responsive to RF entry signals to generate access control signals within the vehicle. The remote entry receiver is further responsive to the uniquely coded RF audio-control signal for generating a digital command. A hard-wire communication link connected between the remote entry receiver and the audio system transfers the digital command from the remote entry receiver to the audio system. The audio system modifies the controlled audio system parameters according to which pushbutton was activated.

BRIEF DESCRIPTION OF THE DRAWINGS

FIG. 3 is a flowchart illustrating a preferred method of the present invention.

FIG. 6 is a table showing control codes for various functions of the present invention.

FIG. 10 is a flowchart showing a method according to an alternative embodiment of the invention.

DETAILED DESCRIPTION OF PREFERRED EMBODIMENTS

Figure 1:
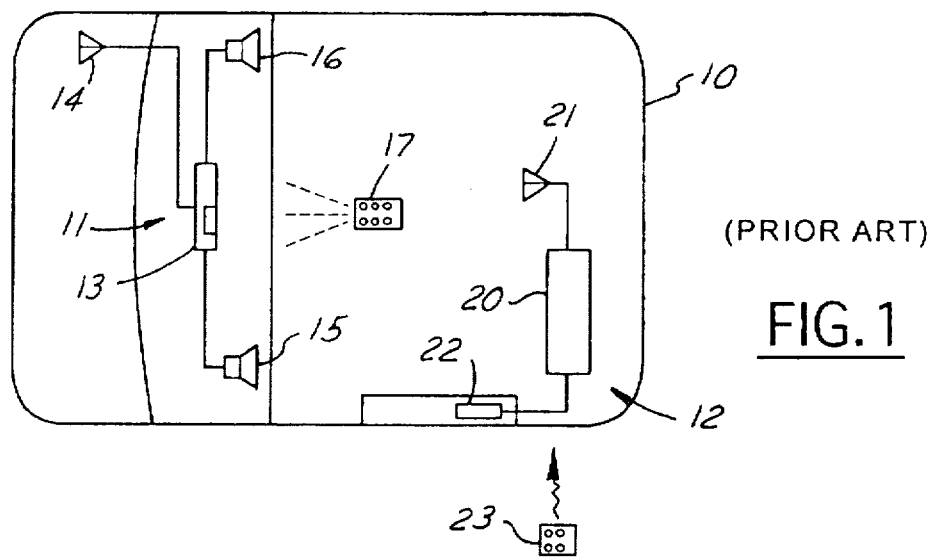
FIG. 1 illustrates the main elements of an automotive remote entry system and a prior art remote-controlled audio system in a vehicle.

A conventional vehicle 10 is shown in FIG. 1 including a remote controlled audio system 11 and a remote entry system 12. Audio system 11 includes a main control unit 13 with an integral infrared receiver, a broadcast reception antenna 14, speakers 15 and 16, and an infrared remote control transmitter 17.

Remote entry system 12 includes a remote entry receiver 20 connected to a remote entry antenna 21 and a door module 22. Receiver 20 receives remote entry commands from a remote entry transmitter 23. Door module 22 controls a lock mechanism, such as a solenoid, for locking and unlocking the vehicle door in response to RF entry signals from transmitter 23, for example.

The audio system in FIG. 1 is relatively expensive as compared to an audio system without a remote control. Whether the remote feature operates via infrared or RF communication, the additional cost of a separate remote receiver is significant. In contrast, the cost of a remote transmitter, especially an RF transmitter, is relatively low.

Figure 2:
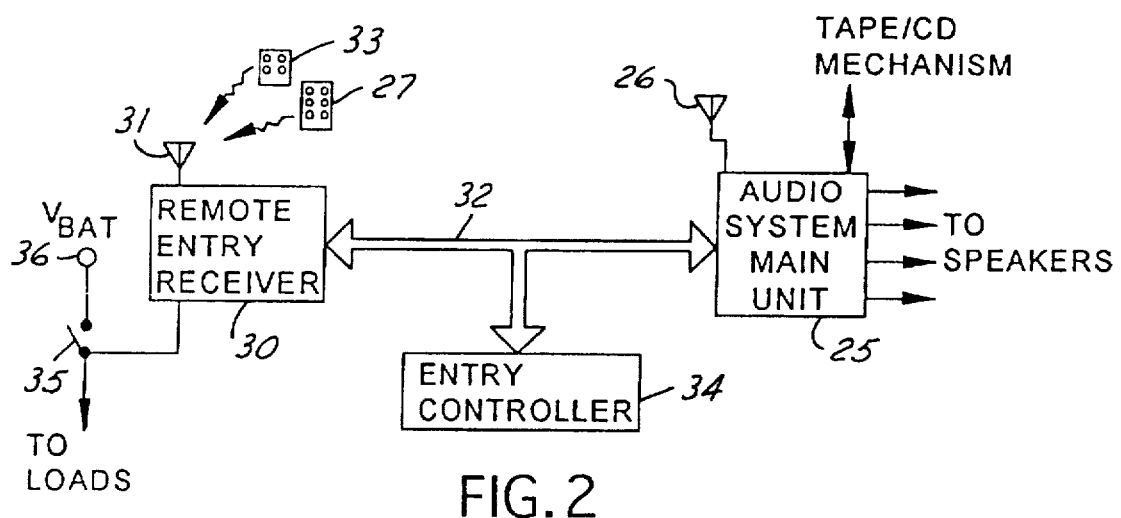
FIG. 2 is a block diagram showing a preferred embodiment of the apparatus of the present invention.

FIG. 2 shows an audio system having a remote control feature without the added cost of a remote receiver. An audio system main unit 25 reproduces broadcast radio signals received by an antenna 26 and/or other audio signals from audio media such as a tape or CD mechanism. Audio system main unit 25 is connected with a remote entry receiver 30 of a security system via a multiplex bus 32. Remote entry receiver 30 has an antenna 31 for receiving RF entry signals from a remote entry pushbutton transmitter 33. In response to proper RF entry signals, remote entry receiver 30 generates access control signals which are sent to an entry controller 34 via multiplex bus 32.

Remote entry receiver 30 is also responsive to RF audio control signals transmitted by an audio remote transmitter 27. In response to the uniquely coded RF audio control signals, remote entry receiver 30 generates digital commands which are coupled to audio system main unit 25 via multiplex bus 32 to modify controlled audio system parameters such as audio volume commands, radio tuning commands, and media control commands (e.g., tape fast wind, change CD track, or change media playback mode). Thus, wireless communication is obtained between the audio remote transmitter and the remote entry receiver, while a hard-wired communication link transfers the digital command between the remote entry receiver and the audio system. Decoding of the specific digital command may take place in either the remote entry receiver, the audio system, or perhaps another module depending upon which has available computing capacity.

Remote entry receiver 30 is connected to ignition switch 35 which connects battery voltage $V_{BAT}$ at a terminal 36 to various loads in the vehicle. Depending upon the state of ignition switch 35, remote entry receiver 30 may enable or disable various remote control commands. Specifically, remote entry functions may be available only when the ignition is off, and audio system remote control may be available only when the ignition switch is on, for example.

The method of the present invention is shown in FIG. 3. In step 40, a person pushes an audio feature button on a remote transmitter. The transmitter encodes and transmits a unique RF audio control signal in step 41. In step 42, the remote entry receiver receives and decodes the RF audio control signal. The decoded command is transferred to the audio system in step 43. In step 44, the audio system parameter is modified by the audio system according to the desired operation that was indicated by the button pushed on the transmitter.

Figure 4:
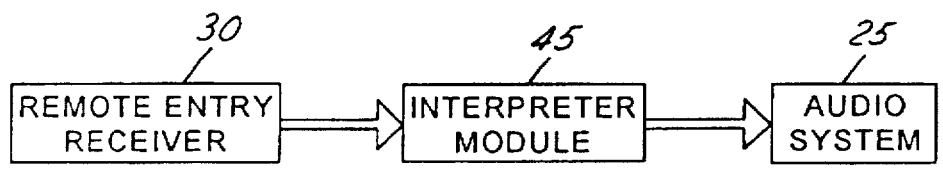
FIG. 4 is a block diagram showing an alternative embodiment of the present invention.

In some embodiments of the present invention, a multiplex bus may not already exist in the vehicle for connecting remote entry receiver 30 and audio system 25. In order to establish a hard-wired communication link between remote entry receiver 30 and audio system 25, many other embodiments are possible. For example, a dedicated signal line may be used between the remote entry receiver and the audio system. Alternatively, an interpreter module 45 may be used as shown in FIG. 4. Depending upon the capabilities of remote entry receiver 30 and audio system 25, interpreter module 45 may utilize either direct signal connections or multiplex links at its input and/or its output. Interpreter module 45 may be a standalone device or may be incorporated within other vehicle electronics.

Figure 5:
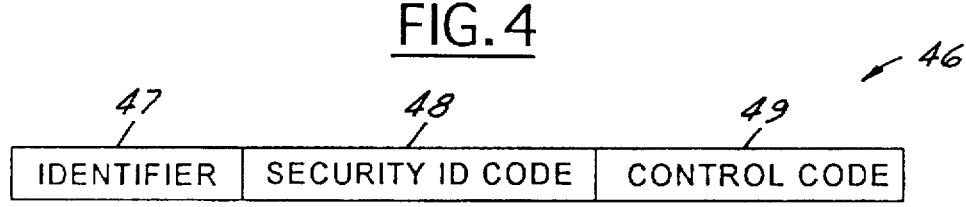
FIG. 5 is a diagram showing the contents of an RF transmission used in a preferred embodiment of the present invention.

An example protocol for an RF transmission signal 46 from a pushbutton RF transmitter is shown in FIG. 5. Each transmission has a predetermined modulation to digitally encode an identifier portion 47, a security ID code portion 48, and a control code portion 49. Identifier portion 47 is used to tell the receiver which remote transmitted the signal (e.g., a separate identifier code is given for each type or manufacturer of the remote transmitter). Security ID code portion 48 contains a fixed code or a predetermined rolling code generated by the transmitter which is recognized by the receiver as an authorized code from an appropriate transmitter. For example, the remote entry receiver may include an operating mode wherein new security ID codes can be added to the receiver memory, thereby allowing the "programming in" of additional authorized remotes to a articular vehicle system. Finally, transmission 46 includes a control code 45 which identifies the specific pushbutton that was activated. Each control code portion 49 has a particular value which is mapped to the desired remote control functions as shown in FIG. 6, for example.

Figure 7:
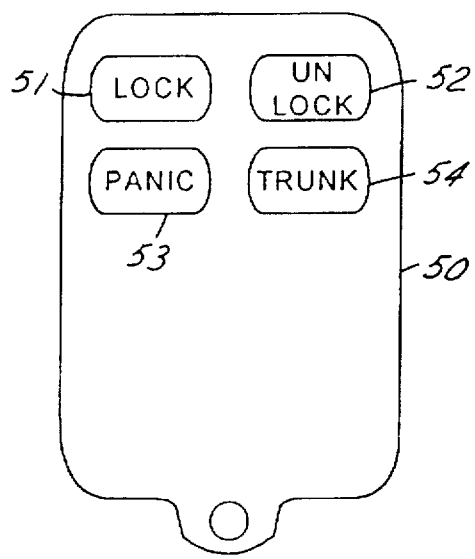
FIG. 7 is a plan view of a remote entry transmitter.
Figure 8:
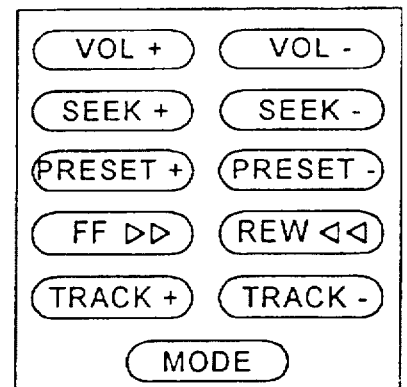
FIG. 8 is a plan view of an audio system remote control transmitter.
Figure 9:
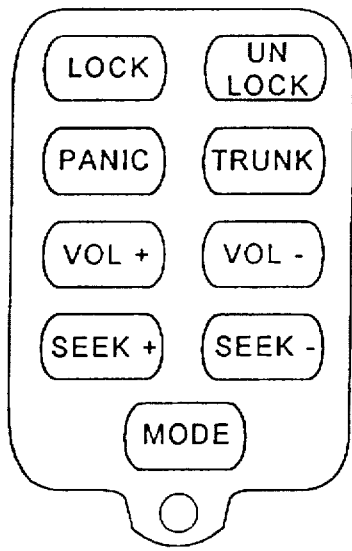
FIG. 9 is a plan view of a combined remote entry/audio system transmitter.

Since multiple transmitters may be programmed into a particular remote entry receiver, separate remote control transmitters may be utilized for separate remote entry functions and audio system function as shown in FIGS. 7 and 8, or an integrated transmitter may be used for accessing both types of functions as shown in FIG. 9. Remote entry transmitter 50 in FIG. 7 includes a lock pushbutton 51, an unlock pushbutton 52, a panic button 53 (for causing lights to flash and horn to honk), and a trunk unlock pushbutton 54. Remote audio control transmitter 55 in FIG. 8 contains pushbuttons accessing only audio system parameters including volume, radio seek, radio preset, tape fast forward and rewind, CD track, and audio system mode. Transmitter 56 in FIG. 9 combines remote entry lock, unlock, panic and trunk functions with some of the controlled audio system parameters. In another alternative embodiment, individual buttons may access either a remote entry feature or an audio system feature depending upon separate modes of the remote entry receiver.

FIG. 10 illustrates a method wherein the remote entry receiver responds to RF signals differently depending upon the state of the ignition switch. An RF transmission is received and decoded in the remote entry receiver in step 60. The security code portion is inspected to determine whether the transmission is from an authorized transmitter. If the transmitter is authorized, then the control code portion is inspected in step 61 to determine whether it is a remote entry signal. If a remote entry signal is found then the state of the ignition is checked in step 62. If the ignition is off, then the remote entry signal sends an access control signal (e.g., to an appropriate door lock) in step 63. If the ignition is not in the off state, then no action is taken in response to the remote entry signal at step 64. If the inspection of the control code portion in step 61 revealed that a remote entry signal was not present then a check is made for an audio control signal in step 65. If the control code portion is not an audio control signal, then an invalid signal is found in step 66 and no action is taken. Provided an audio signal was found, then the state of the ignition switch is checked in step 67 to determine whether the ignition is on or in the accessory position. If the ignition is off then no action is taken in step 68. If the ignition is on or in the accessory position, then a digital command corresponding to the desired modification of an audio system parameter is sent to the audio system in step 69.

In an alternative embodiment to FIG. 10, the state of the ignition switch could be checked first and then the control code portion interpreted depending upon whether the ignition is off or is in the on or accessory position.

Figure 11:
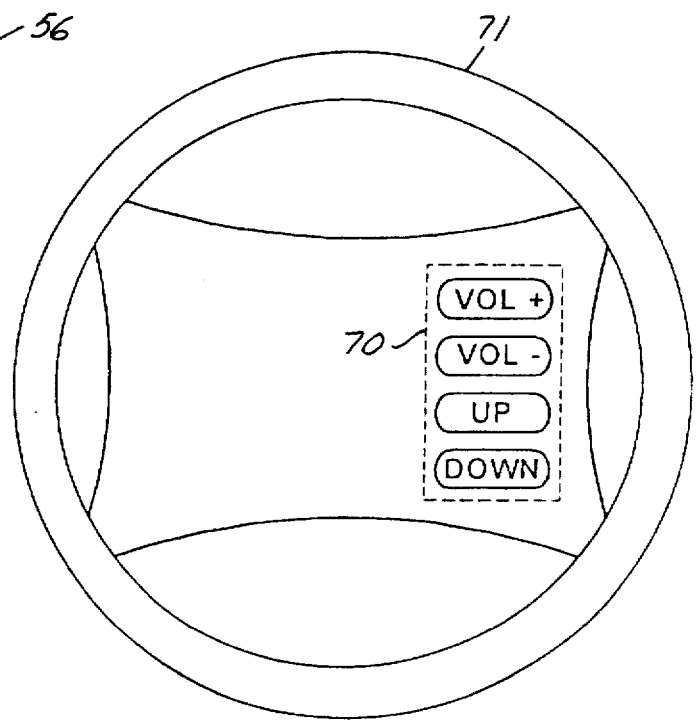
FIG. 11 is a plan view showing a steering-wheel mounted transmitter.

FIG. 11 shows another alternative embodiment wherein the remote transmitter for controlling audio system parameters is mounted in a fixed position in the vehicle. In particular, a transmitter 70 is mounted on or in a steering wheel 71 to reduce the number of wires that would have to be run through a steering column. Additional remote control functions such as speed control and climate control functions could be included in the remote control function.

The foregoing invention allows a remote control function to be provided as an option in a vehicle which requires little or no changes to the audio system and utilizes a remote receiver already built into many vehicles. The communication protocol of the remote entry system need not be changed in order to implement the audio remote controls. Only additional programming is needed for decoding additional remote control features and the communication of the information from the remote entry system to the audio system.

What is claimed is:

1. Apparatus for an automotive vehicle providing a remote-controlled entry system and a remote-controlled audio system, said apparatus comprising:

an audio system for reproducing audio signals having operator controlled audio system parameters, said audio system responsive to digital commands for modifying said controlled audio system parameters, said audio system including a first electronic module;

a first pushbutton remote-control RF transmitter having a plurality of pushbuttons each corresponding to a respective one of said digital commands, said first pushbutton RF transmitter transmitting a uniquely coded RF audio-control signal in response to activation of a respective pushbutton;

a remote entry receiver responsive to RF entry signals for generating access control signals within said vehicle, said remote entry receiver being further responsive to said uniquely coded RF audio-control signal for generating a digital command, said remote entry receiver comprised of a second electronic module separate from said first module; and a hard-wired communication link between said remote entry receiver and said audio system for transferring said digital command from said remote entry receiver to said audio system, whereby said audio system modifies said controlled audio system parameters according to which pushbutton was activated.

2. The apparatus of claim 1 further comprising:

a second pushbutton remote-control RF transmitter having a plurality of pushbuttons each corresponding to a respective remote entry command, said second pushbutton RF transmitter transmitting one of said RF entry signals in response to activation of a respective pushbutton.

3. The apparatus of claim 1 wherein said first pushbutton RF transmitter transmits one of said RF entry signals in response to activation of a respective pushbutton of said first pushbutton RF transmitter.

4. The apparatus of claim 1 wherein said communication link is comprised of a multiplex interconnection.

5. The apparatus of claim 1 wherein said communication link is comprised of an interpreter module.

6. The apparatus of claim 1 wherein said vehicle comprises an ignition switch coupled to said remote entry receiver, and wherein said remote entry receiver is responsive to said uniquely coded RF audio-control signal depending upon position of said ignition switch.

7. The apparatus of claim 1 wherein said uniquely coded RF audio-control signal is comprised of a security code portion and a control code portion, said security code portion identifying whether said first pushbutton RF transmitter is authorized for said vehicle.

8. The apparatus of claim 1 wherein said first pushbutton RF transmitter is mounted in a fixed position in said vehicle.

9. The apparatus of claim 8 wherein said fixed position is located on a steering wheel.

10. The apparatus of claim 2 wherein said uniquely coded RF audio-control signal is comprised of a security code portion and a control code portion, said remote entry receiver having a learning mode for storing said security code portion of said first pushbutton RF transmitter so that said security code portion thereafter identifies said first pushbutton RF transmitter as being authorized for said vehicle.

11. The apparatus of claim 1 wherein said controlled audio system parameters include audio volume commands.

12. The apparatus of claim 1 wherein said controlled audio system parameters include radio tuning commands.

13. The apparatus of claim 1 wherein said controlled audio system parameters include media control commands.

14. The apparatus of claim 1 wherein said access control signals include commands for locking and unlocking vehicle doors.

15. A method for remotely controlling audio system parameters of an audio system in an automotive vehicle, comprising the steps of:

transmitting a uniquely coded RF audio-control signal in response to a manual activation of a remote control by a vehicle occupant;

receiving said uniquely coded RF audio-control signal in a remote entry receiver mounted in said vehicle in a module separate from said audio system;

decoding said uniquely coded RF audio-control signal to produce a digital command;

transferring said digital command from said remote entry receiver to said audio system; and modifying said audio system parameters in response to said digital command.

16. The method of claim 15 further comprising the steps of:

transmitting RF entry signals in response to a manual activation of a remote control;

receiving said RF entry signals in said remote entry receiver;

decoding said RF entry signals to produce an access control signal; and activating a vehicle access device in response to said access control signal;

wherein said uniquely coded RF audio-control signal and said RF entry signals are produced by separate remote transmitters.

* * * * *